United States Patent
Rozman et al.

(10) Patent No.: US 7,332,884 B2
(45) Date of Patent: Feb. 19, 2008

(54) ELECTRIC MOTOR CONTROL STRATEGIES

(75) Inventors: Gregory I. Rozman, Rockford, IL (US); Kenneth Marks, Southwick, MA (US); James R. Gustafson, Granby, MA (US); Douglas Parsons, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 190 days.

(21) Appl. No.: 10/893,462

(22) Filed: Jul. 16, 2004

(65) Prior Publication Data

US 2006/0012321 A1 Jan. 19, 2006

(51) Int. Cl.
*H02P 7/00* (2006.01)
(52) U.S. Cl. .................... 318/432; 318/434
(58) Field of Classification Search ............ None
See application file for complete search history.

(56) References Cited

U.S. PATENT DOCUMENTS

| | | | | |
|---|---|---|---|---|
| 4,492,903 A | * | 1/1985 | Knight et al. | 318/254 |
| 4,695,736 A | * | 9/1987 | Doman et al. | 290/44 |
| 4,949,021 A | | 8/1990 | Rozman et al. | |
| 5,029,263 A | | 7/1991 | Rozman | |
| 5,803,197 A | * | 9/1998 | Hara et al. | 180/248 |
| 5,929,576 A | * | 7/1999 | Yasohara et al. | 318/254 |
| 6,018,198 A | * | 1/2000 | Tsuzuki et al. | 290/17 |
| 6,018,233 A | | 1/2000 | Glennon | |
| 6,037,752 A | | 3/2000 | Glennon | |
| 6,194,856 B1 | * | 2/2001 | Kobayashi et al. | 318/432 |
| 6,242,881 B1 | * | 6/2001 | Giordano | 318/700 |
| 6,358,186 B1 | * | 3/2002 | Kosik et al. | 477/176 |
| 6,498,451 B1 | * | 12/2002 | Boules et al. | 318/661 |
| 6,554,088 B2 | * | 4/2003 | Severinsky et al. | 180/65.2 |

OTHER PUBLICATIONS

U.S. Appl. No. 10/881,309, filed Jun. 30, 2004.
U.S. Appl. No. 10/872,625, filed Jun. 21, 2004.
U.S. Appl. No. 10/806,635, filed Mar. 23, 2004.

* cited by examiner

*Primary Examiner*—Lincoln Donovan
*Assistant Examiner*—Renata McCloud
(74) *Attorney, Agent, or Firm*—Carlson, Gaskey & Olds

(57) ABSTRACT

An electric start system (20) includes a controller (40) that controls operation of a motor (22) used to start a device such as a gas turbine engine (24). In one example, the controller (40) determines when an acceleration rate of the motor (22) is outside of a desired range and dynamically controls the acceleration rate. In another example, the controller (40) determines when the motor (22) is disengaged from the engine (24) and controls a torque reference value to facilitate smoother reengagement. In another example, the controller (40) provides an initial starting torque value that allows for soft starting capabilities of the motor (22).

29 Claims, 13 Drawing Sheets

ELECTRIC MOTOR CONTROL STRATEGIES

1. FIELD OF THE INVENTION

This invention generally relates to electric motor control. More particularly, this invention relates to electric motor control strategies useful for electric start systems.

2. DESCRIPTION OF THE RELATED ART

Electric motors have a variety of uses. One is for electric start systems for starting engines, such as gas turbine engines. Different types of electric motors have been used for such purposes. In some instances, AC brushless motors with sinusoidal back-EMF and current wave forms are employed in electric engine start systems that require very smooth torque control. Such arrangements include a high number of poles to achieve higher power density (i.e., a higher ratio of torque per amp).

Regardless of the type of motor used, there are potential challenges during operation of the electric start system or the associated engine. For example, during an initial start up it is difficult to obtain sufficient motor position information to provide accurate torque control. This is particularly true where low resolution position sensors may be employed for motor commutation. There is a need for a torque control strategy during initial start up that allows for accurate motor control at the very low start up speeds.

Another potential challenge is to avoid undesirable disengagement between the motor and the associated engine. Systems that have a clutch for purposefully disengaging the motor and the engine present the possibility for inadvertent or undesirable disengagement. This may occur, for example, during rapid decelerations or other significant changes in the engine performance, for example.

Another issue presented by typical electric start systems is that reengagement between the motor and engine may exceed the clutch rating or excite the engine dynamic system. This is due at least in part because of the significant difference between the engine inertia and the motor inertia. Another problem associated with inadvertent disengagement is that a gain of a motor speed control loop becomes significantly higher compared to the gain when the components are reengaged. This condition may lead to underdamped or unstable speed loop operation during the period of disengagement, which is undesirable.

In some example systems, a constant acceleration and deceleration rate are programmed into a motor controller. The limitation on such an arrangement is that if the acceleration rate is set too high it may overstress the motor drive because it will reach the current limit, for example. If, on the other hand, the acceleration rate is set too low, it undesirably increases engine start time. Moreover, with an electric engine start system having a clutch, a fast deceleration rate may lead to motor disengagement. As mentioned above, it is important to avoid the engine dynamics associated with reengagement. Moreover, it is desirable to avoid disengagement when it is otherwise not necessary.

There is a need for an improved motor control arrangement that addresses the problems discussed above. This invention provides improved torque control, acceleration rate control and reengagement control.

SUMMARY OF THE INVENTION

An example electric start system designed according to one embodiment of this invention includes an electric motor that is adapted to be coupled to a device for starting the device. In one example, the device is a gas turbine engine. A controller controls movement of the electric motor. The controller may perform at least one of various function to address at least one of three situations.

In one example, the controller provides a starting torque signal for driving the motor during an initial start up of the device. The starting torque signal ramps up from a zero value to a selected value. The starting torque signal remains constant at the selected value until the controller determines that the motor has reached a chosen threshold speed.

In one example, the chosen threshold speed corresponds to a motor speed at which the controller switches between square wave commutation and sinusoidal commutation.

In another example, the controller determines when an acceleration rate of the motor is outside of a selected range. The controller automatically alters the acceleration rate to bring it back within the selected range.

In another example, the controller determines when the motor is disengaged from the device for a period of time and changes a motor torque reference signal from a present signal value corresponding to a present, operating motor speed to a higher value. In one example, the controller increases the value of the motor torque reference signal to the maximum allowable for the particular motor.

One example method of controlling an electric motor in an electric start system where the motor is used to start a device includes providing a starting torque signal for driving the motor during an initial start up of the device. The starting torque signal ramps up from a zero value to a selected value. In one example, the starting torque signal value remains constant at the selected value until a desired motor speed is achieved.

Another example method includes determining when an acceleration rate of the motor is outside of a selected range and automatically altering the acceleration rate.

Another example method includes determining when the motor is disengaged from the device and changing a motor torque reference signal from a present signal value corresponding to a present motor speed to a higher value.

The various features and advantages of this invention will become apparent to those skilled in the art from the following detailed description of currently preferred embodiments. The drawings that accompany the detailed description can be briefly described as follows.

DETAILED DESCRIPTION OF THE PREFERRED EMBODIMENTS

Figure 1:
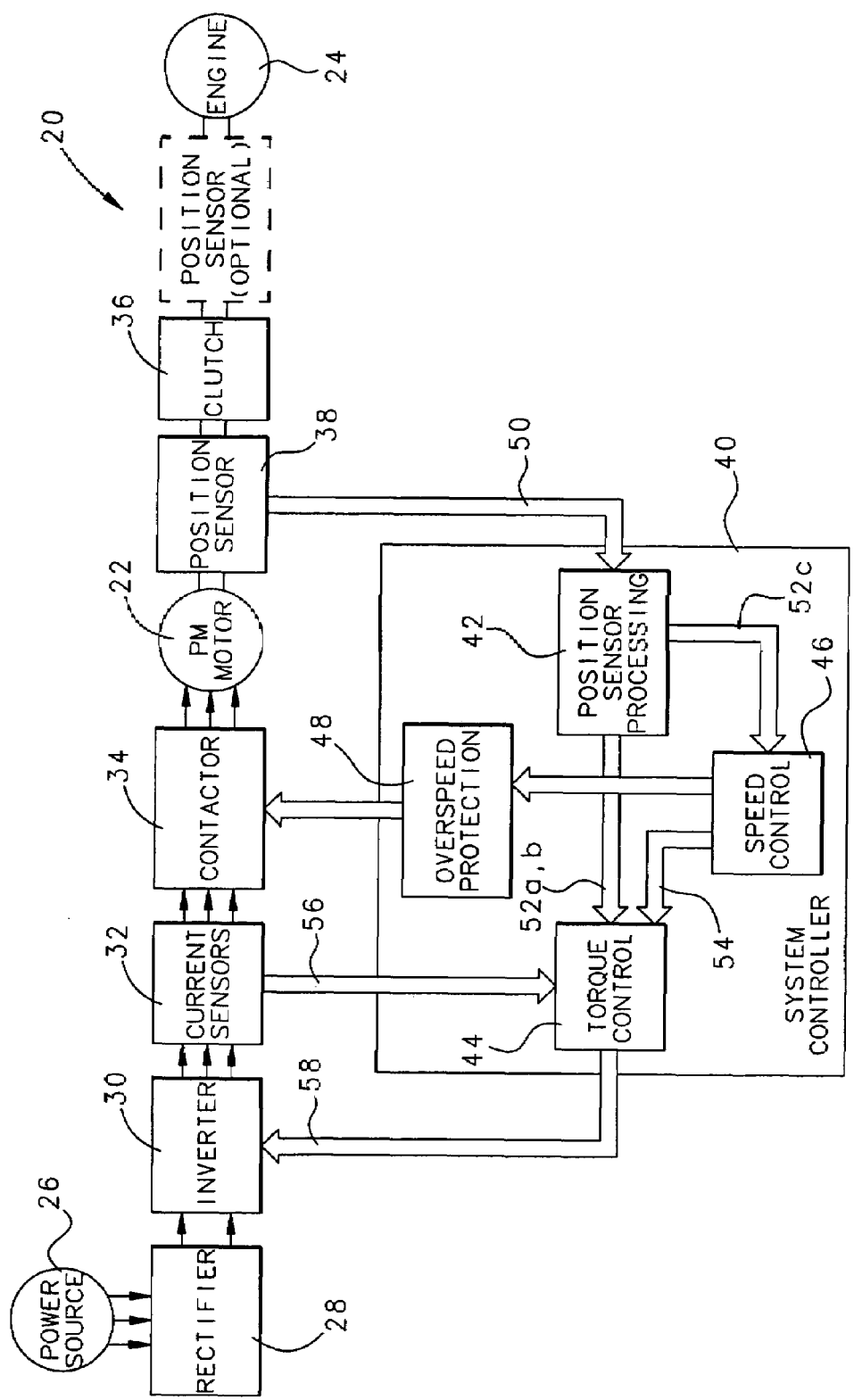
FIG. 1 schematically illustrates an electric start arrangement designed according to an embodiment of this invention.

FIG. 1 schematically illustrates an electric start system 20 having an electric motor 22 for starting an engine 24. In one example, the motor 22 is a permanent magnet motor and the engine 24 is a gas turbine engine. The motor 22 receives power from a power source or grid 26 through a rectifier 28 that is in series with an inverter 30, both of which may operate in a known manner. Current sensors 32 and a contactor 34 are provided between the inverter 30 and the motor 22 for control and inverter protection, respectively. The current sensors 32 and contactor 34 operate in a known manner.

A low resolution position sensor 38 provides motor position information to a controller 40 that controls operation of the motor 22. In one example, the position sensor 38 comprises at least one hall sensor and provides output signals with a plurality of phases that equals the number of phases of the motor 22. In one example, the number of hall sensors equals the number of phases of the motor 22. The controller 40 utilizes square wave output signals from the position sensor 38 for controlling the motor 22 and converts the square wave sensor signals into sinusoidal commutation signals so that sinusoidal motor excitation can be used with a low resolution position sensor.

In one of the example embodiments to be described below, the controller 40 switches between using square wave signal commutation (i.e., 120° commutation) at low motor speeds and sinusoidal signal commutation (i.e., 180° commutation) once the motor speed exceeds a selected threshold. Square wave commutation at low speeds takes into account the difficulties associated with obtaining position information from low resolution position sensors. In another example embodiment to be described below, the controller 40 converts the position sensor signals into sinusoidal signals for motor control even at low motor speeds.

Figure 2:
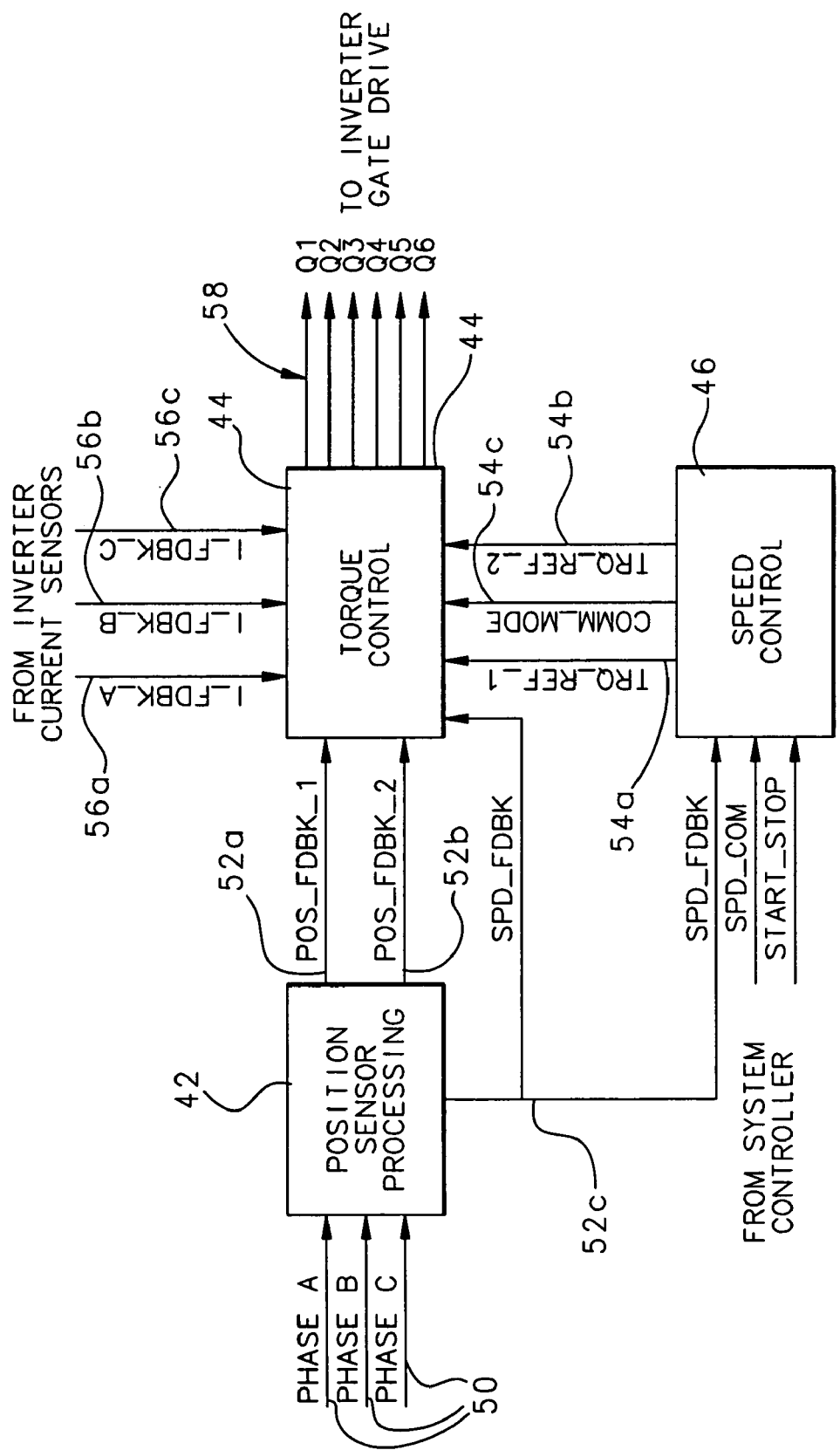
FIG. 2 schematically illustrates selected portions of the controller used in the embodiment of FIG. 1 for controlling an electric motor.

The illustrated controller 40 includes several modules schematically shown in FIGS. 1 and 2. A position sensor processing module 42 provides information to a torque control module 44 and a speed control module 46. The speed control module 46 provides information to the torque control module 44 and an over speed protection module 48 that controls the contactor 34 to protect against any over voltage that may damage the inverter 30 in case the clutch fails to disengage.

The position sensor processing module 42 receives position information 50 from the position sensor 38. In one example, the module 42 provides speed feedback information 52c to the speed control module 46 and electrical angle information 52a, b to the torque control module 44. The speed control module 46 provides a torque reference 54 to the torque control module 44. The torque control module 44 also receives current information 56 from the current sensors 32. The torque control module 44 generates an output 58 that drives the gates of the inverter 30 for powering the motor 22 according to the needs of a particular situation.

Referring to FIG. 2, several of the modules of the controller 40 are shown. In this example, the motor 22 is a three-phase motor and the sensor arrangement 38 provides three-phase output signals 50 to the position sensor processing module 42. In this example, the sensor processing module 42 provides a first output at 52A that is a position feedback signal used for square wave (i.e., 120°) commutation. A second position feedback signal at 52B is provided to the torque control module 44 when the motor speed has exceeded a selected threshold for sinusoidal (i.e., 180°) commutation. The sensor processing module 42 also provides a speed feedback signal 52C to the torque control module 44 and the speed control module 46.

In this example, the speed control module 46 provides three different outputs to the torque control module 44. A first torque reference signal 54A is used by the torque control module during square wave commutation. A second torque reference signal 54B is used by the torque control module 44 during sinusoidal commutation. A commutation mode signal 54C provides an indication of when to switch between square wave commutation and sinusoidal commutation. The motor speed threshold at which the switch is made can be selected depending upon the needs of a particular situation. Those skilled in the art who have the benefit of this description will be able to select an appropriate threshold.

The torque control module 44 also receives three phase current feedback information 56A, 56B and 56C from the current sensors 32.

Figure 3:
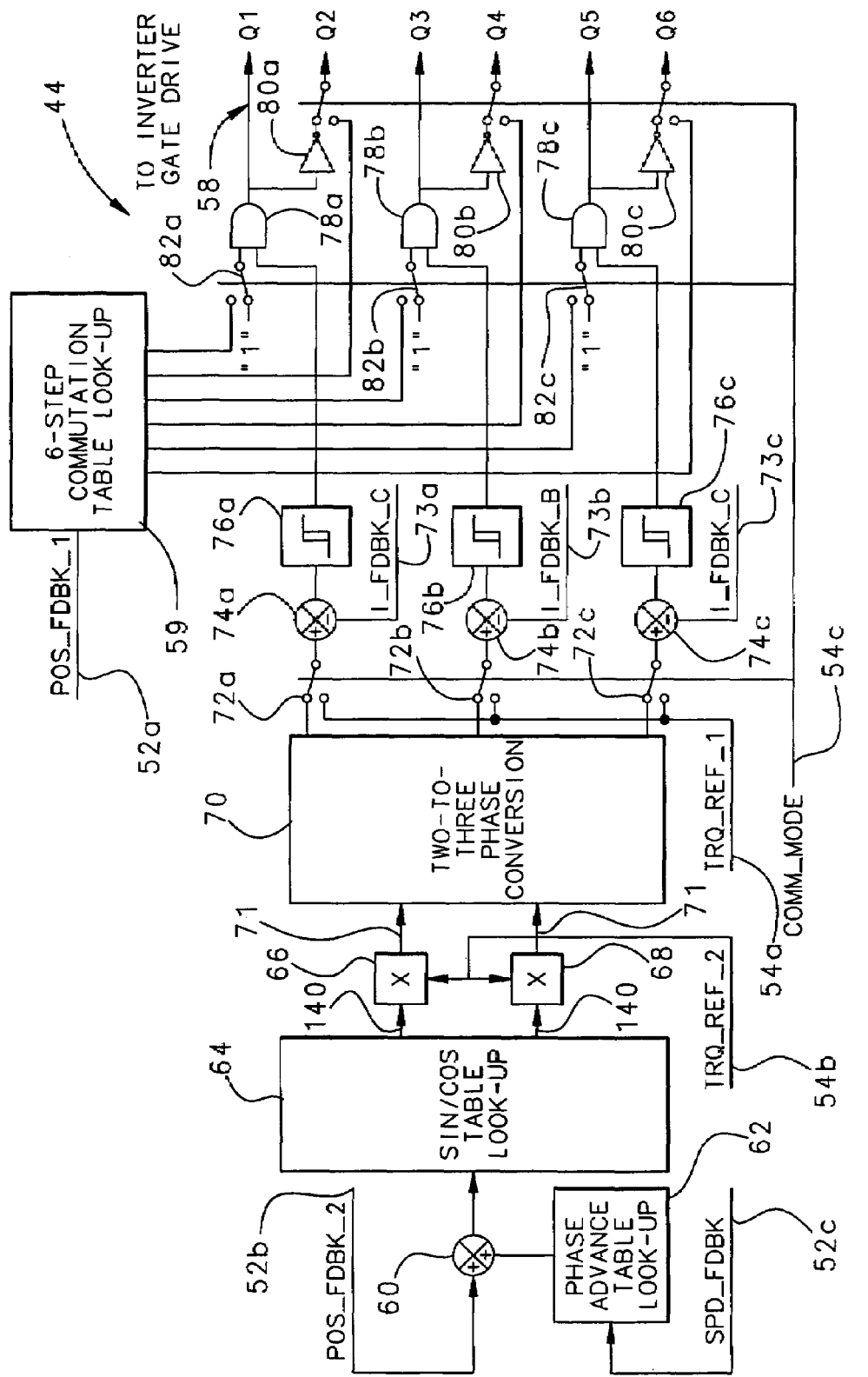
FIG. 3 schematically illustrates an example torque control module from the embodiment of FIG. 2.

One example implementation of the torque control module 44 is schematically shown in FIG. 3. At low motor speeds, square wave commutation is used to provide motor control signals 58. The position feedback signal 52A from the speed processing module 42 is provided to a six-step commutation look-up table 59. The output of the commutation look-up table results in the signals 58 provided to the inverter gates, which in this example includes six gates. In one example, the position feedback signal 52A is a three-bit word based upon the three phase input 50 from the low resolution position sensor 38 (i.e., three hall sensors). Square wave commutation can be used at low motor speeds at the beginning of a starting procedure for the engine 24, for example.

When sinusoidal commutation is used, a summer 60 receives the position feedback signal 52B from the sensor processing module 42. In this example, a phase advance look-up table 62 responds to the speed feedback signal 52C to add a phase advance when necessary to reduce the field produced by rotating magnets of the motor 22 at high speeds, for example. The output of the summer 60 is processed by a sin/cos look-up table 64. A sin output from the look-up table 64 is multiplied in a multiplier 66 with the torque reference signal 54B from the speed control module 46. A cos signal from the look-up table 64 is multiplied by a multiplier 68 with the same torque reference signal 54B. The output of the multipliers 66 and 68 is a sinusoidal wave form commutation signal used for timing the current supply to the motor to control the phase relationship between the supplied current and the field present in the motor according to known motor control principles.

A two-to-three phase converter 70 converts the signal 71 into three signals. Switches 72A, 72B and 72C are controlled responsive to the commutation mode signal 54C provided by the speed control module 46. During sinusoidal commutation, the switches 72 conduct the output signals from the converter 70 to summers 74A, 74B and 74C. During square wave commutation (i.e., at very low motor speeds), the switches 72 are switched responsive to the signal 54c such that the torque reference signal 54A is provided to the summers 74 instead of the signals from the converter 70.

A current feedback signal 73a, b, c is combined with the signals from the converter 70 during sinusoidal communication or the torque reference signal 54a during square wave commutation.

The output of the summers 74A, 74B and 74C, which are error signals indicating a difference between the command signals from the converter 70 and the current feedback signals 73a, b, c, are provided to voltage comparators with a hysteresis 76A, 76B and 76C, respectively. The output of those regulators are ANDed at 78A, 78B and 78C, respectively. The output inverter gate drive signals Q1, Q3 and Q5 come directly from the AND gates 78. The signals Q2, Q4 and Q6 are inverted by inverters 80A, 80B and 80C. Switches associated with the AND gates 78 and the inverter 80 are also controlled by the commutation mode signal 54C from the speed control module 46.

The commutation mode signal 54c also controls switches 82a, b, c to provide the output of the look up table 59 to the AND gates 78 during square wave commutation. During sinusoidal commutation, the switches 82 are connected to a logic "1" signal so that the output from the voltage comparators 76 control the output from the AND gates 78 and ultimately the signals 58.

Figure 4:
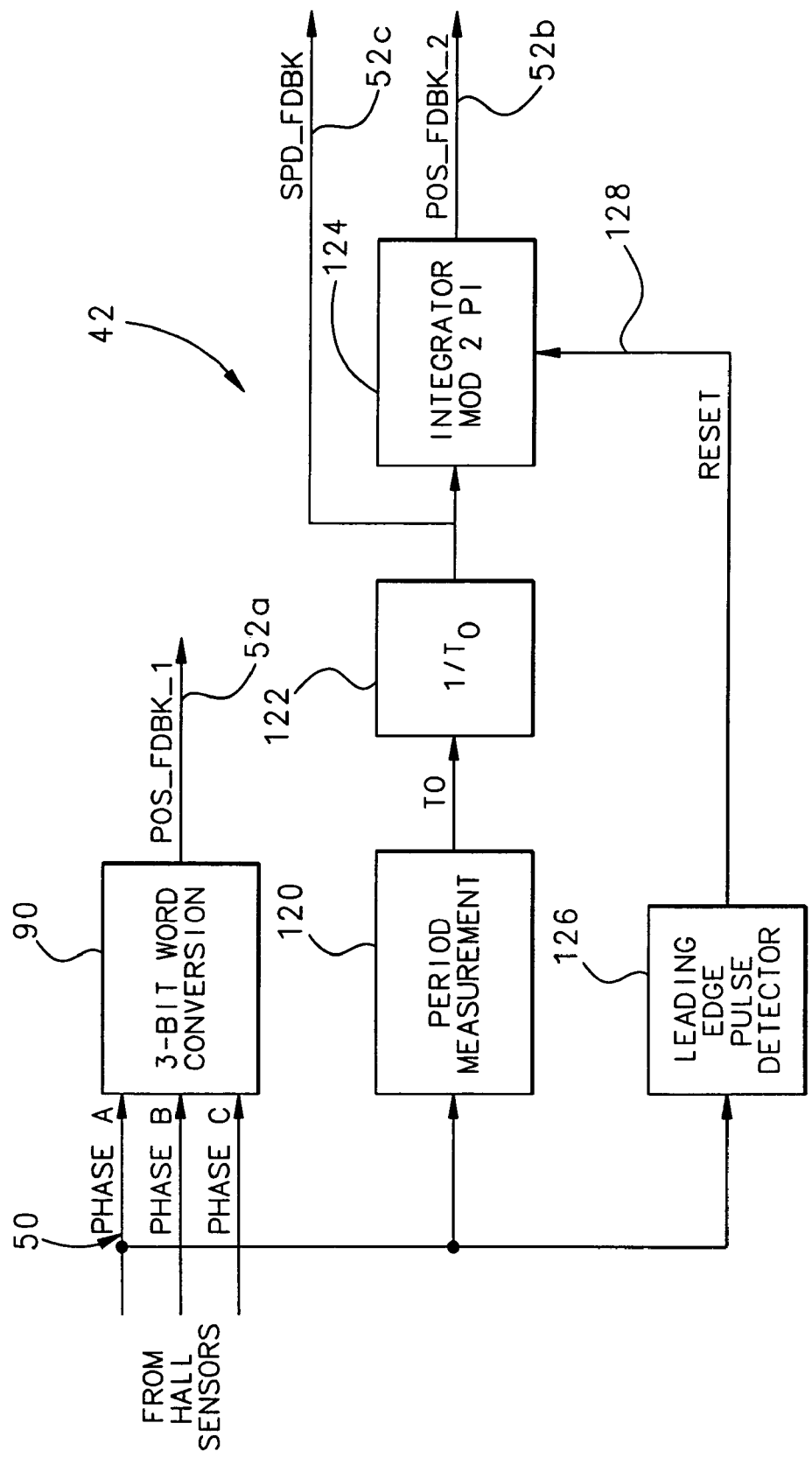
FIG. 4 schematically illustrates the example low resolution position sensor processing module from the embodiment of FIG. 2.

The position feedback signals 52A and 52B are provided in one example by a position sensor processing module 42 as schematically shown in FIG. 4. At low motor speeds when square wave commutation is used, the three phase inputs 50, which are square wave output signals from the low resolution position sensor 38 are converted into a three bit word by a conversion module 90 to provide the position feedback signal 52A. There are various ways to provide a three bit word that can be used as the inverter gate drive outputs 58 for square wave commutation using a six-step commutation look-up table 59 as shown in FIG. 3, for example.

Figure 5A:
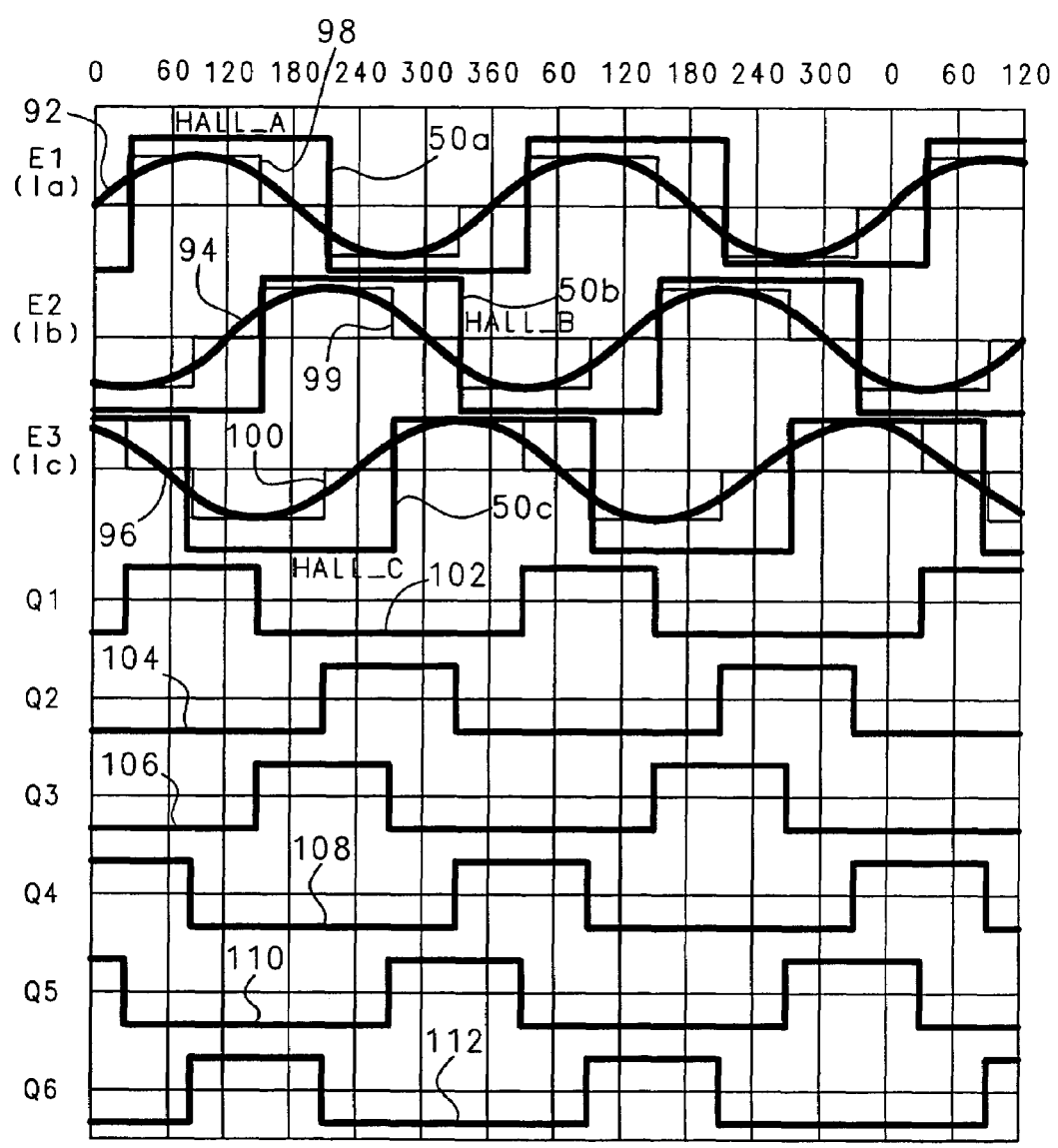
FIG. 5A is a timing diagram showing a plurality of signals associated with one mode of using a portion of the embodiment of FIG. 4 and a portion of the embodiment of FIG. 3.

FIG. 5A is a timing diagram showing various signals and one example way designed to an embodiment of this invention for developing the three bit word position feedback signal 52A. In FIG. 5A, the three phase position sensor square wave output signals 50A, 50B and 50C are shown associated with the back EMF wave forms 92, 94 and 96 from the corresponding phases of the motor 22. The rectangular current input to the motor 22 for each phase is shown corresponding to the associated sensor output and back EMF at 98, 99 and 100, respectively. As can be appreciated from FIG. 5A, there is a 120° phase shift between each of the phases shown at the top of FIG. 5A.

The three bit word provided to the commutation look-up table 59 is based upon the edges of the position sensor signals 50A, 50B and 50C. The conversion module 90 generates the three bit word 52A and the output of the look-up table 59 comprises the commutation signals 102, 104, 106, 108, 110 and 112. These correspond to the Q1-Q6 signals shown in FIGS. 2 and 3 during square wave commutation.

The signal at 102 includes pulses that have a rising edge corresponding to the rising edge of the sensor output signal 50A and a falling edge that corresponds to the rising edge of the sensor output signal 50B. The signal 104 has a rising edge associated with the falling edge of the sensor output signal 50A and a falling edge associated with the falling edge of the sensor output signal 50B. The signal 106 has pulses with a rising edge associated with the rising edge of the sensor output signal 50B and a falling edge associated with the rising edge of the sensor output signal 50C. The signal 108 has pulses associated with the falling edge of the signal 50B and the falling edge of the signal 50C. The signal 110 has pulses with a rising edge associated with the rising edge of the signal 50C and a falling edge associated with the rising edge of the signal 50A. Lastly, the signal 112 has pulses having a rising edge associated with the falling edge of the signal 50C and a falling edge associated with the falling edge of the signal 50A.

Commutation look up tables providing such an output can be developed using known techniques. Those skilled in the art who have the benefit of this description will be able to select from among such known techniques for providing square wave commutation signals like those schematically shown in FIG. 5A.

Once the motor 22 has reached a selected threshold speed (100 RPMs in one example), the controller 40 preferably switches from square wave commutation to sinusoidal commutation. At this point and for all motor speeds above the selected threshold, the commutation mode signal 54C preferably controls the switches within the torque control module 44 schematically shown in FIG. 3 so that the position feedback signal 52B is used for commutation rather than the square wave commutation associated with the position feedback signal 52A.

Referring again to FIG. 4, the position sensor processing module 42 includes a period measurement module 120 and a frequency determining module 122 that generates the speed feedback signal 52C. The output of the frequency determining module 122 is integrated by an integrator 124 to generate the position feedback signal 52B. In one example, the position feedback signal 52B is a sawtooth signal that is indicative of the electrical angle position of the motor.

Figure 5B:
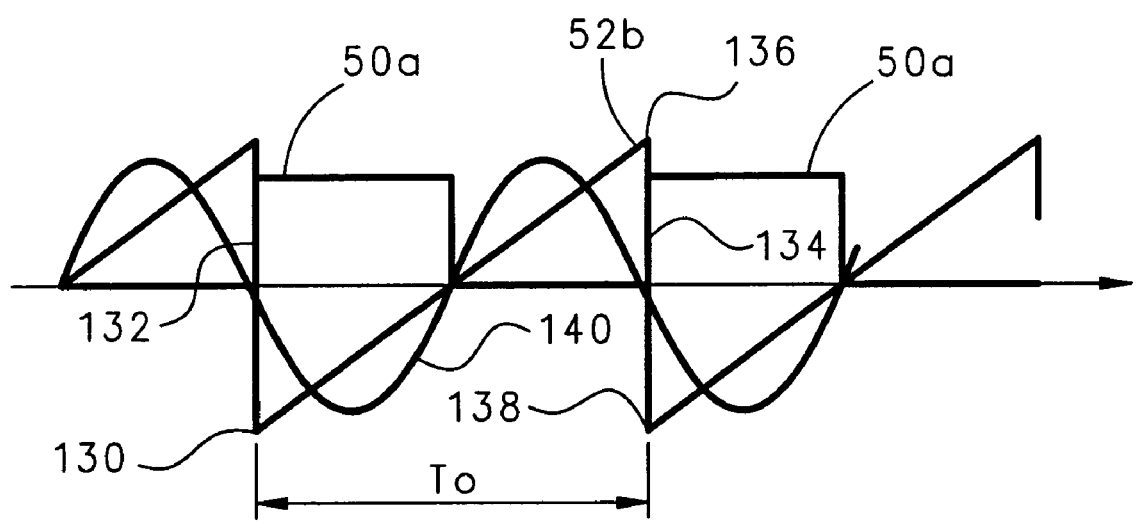
FIG. 5B is a timing diagram showing several signals associated with using another portion of the embodiment of FIG. 4 and a portion of the embodiment of FIG. 3.

Referring to FIG. 5B, a hall sensor output signal 50A is shown superimposed with a sawtooth signal that is the position feedback signal 52B. The electrical angle estimation begins at zero responsive to a leading edge pulse detector 126 that provides a reset signal 128 to the integrator 124. As can be appreciated from FIG. 5B at the leading edge of the sensor output signal 50A, the sawtooth signal 52B begins at zero at 130 when the leading edge 132 of the signal 50A occurs. Resetting the integrator 124 in this manner provides a unique way of selecting at least one phase of the sensor output as an initiator phase to reset the electrical angle position estimation. At the next leading edge 134 of the signal 50A the sawtooth signal 52B has reached a 360° maximum at 136 and is again reset to zero at 138 responsive to the reset signal 128 from the leading edge pulse detector 126.

By integrating the frequency of the square wave output signal 50A, the position sensor processor module 42 provides an estimation of the electrical angle of the motor through the position feedback signal 52B. That signal is then provided to the torque control module 44 as can be seen, for example, in FIG. 3. The sinusoidal current wave form 140 shown in FIG. 5B corresponds to the output 140 of the sin/cos look up table 64 in the embodiment of FIG. 3. That sinusoidal current wave form 140 is derived from the position feedback signal 52B and multiplied by the torque reference signal 54B from the speed control module 46.

Figure 6:
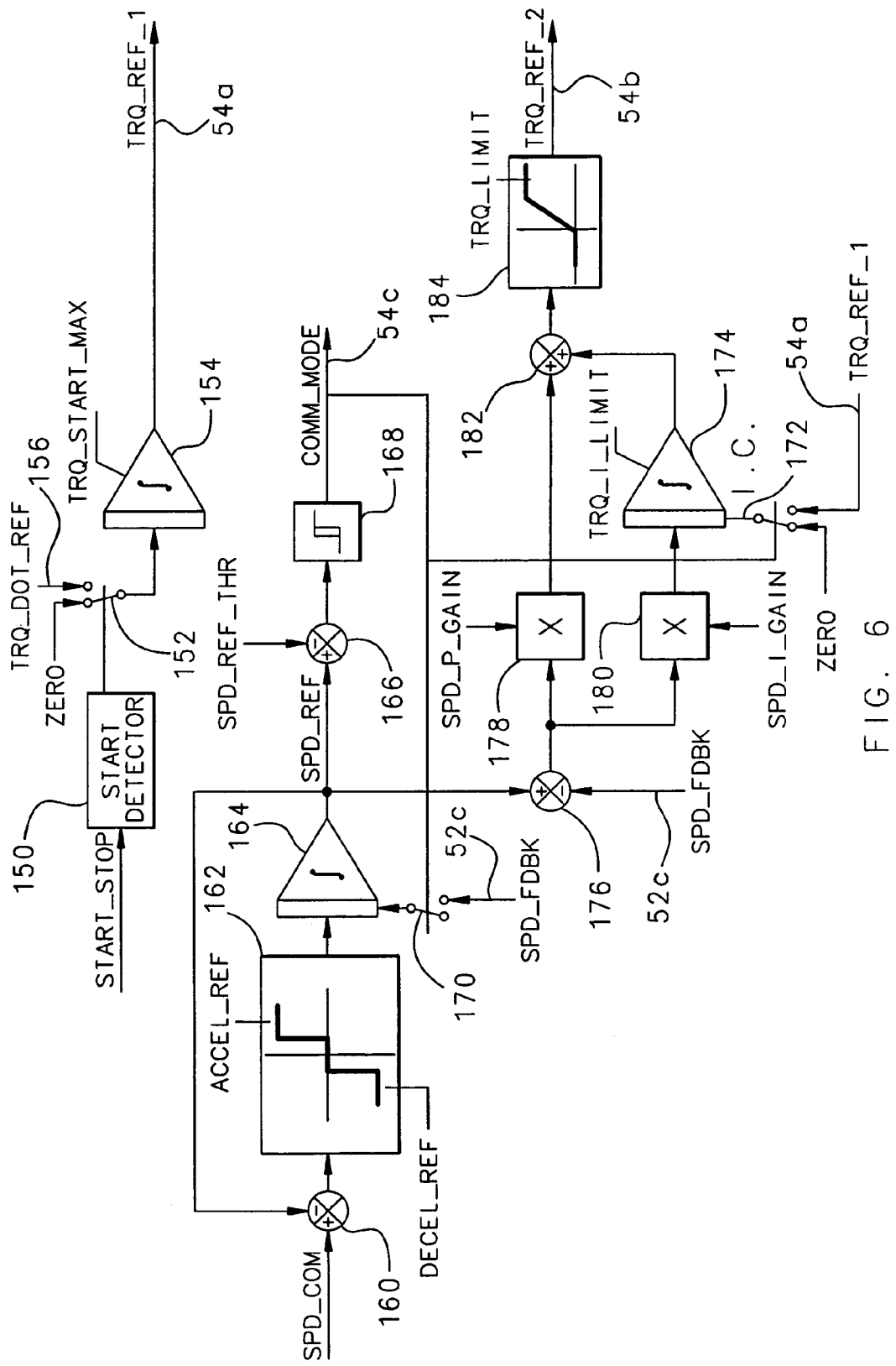
FIG. 6 schematically illustrates the speed control module of the embodiment of FIG. 2.

FIG. 6 schematically shows one example embodiment of the speed control module 46, which provides the torque reference signal 54A used for sinusoidal commutation. At initial motor start up, a start detector 150 receives a start-stop signal and operates a switch 152 so that an integrator 154 begins ramping up the torque reference signal 54A based upon the rate of ramp-up provided by the torque dot reference signal 156. The torque reference signal 54A is used by the torque control module 44 as shown in FIG. 3, for example. This is associated with square wave commutation at low motor speeds.

At the same time that the start-stop signal initiates the start detector 150, a speed command signal is provided to a summer 160 whose output is provided to a non-linear step command block 162. The output of the non-linear block 162 is provided to an integrator 164 that ramps up a speed reference output until it equals the speed command signal value. The speed reference output is provided to a summer 166 that also receives a speed reference threshold, which is the selected threshold motor speed at which the switch is made between square wave and sinusoidal commutation.

A zero crossing detector 168 receives the output of the summer 166 and provides the commutation mode signal 54C that provides the indication when to switch from square wave commutation to sinusoidal commutation.

The signal 54C operates the switch 170 associated with the integrator 164 so that the speed feedback signal 52C is provided to the integrator 164. At the same time, the signal 54C operates a switch 172 so that another integrator 174 is initiated with the torque reference signal 54A. The speed reference output from the integrator 164 is provided to a summer 176. The speed feedback signal 52C is combined with the speed reference signal in the summer 176. The output of the summer 176 is provided to multipliers 178 and 180 that receive proportional gain and integral gain inputs, respectively. The multiplied and integrated signals are then combined in a summer 182 and provided to the torque limiting function block 184 whose output is the torque reference signal 54B used by the torque control module 44 during sinusoidal (i.e., 180°) commutation.

In the above example, square wave (i.e., 120°) commutation is used at low motor speeds because the low resolution position sensors typically cannot provide accurate enough information to achieve good motor control. In another example, a technique for converting the square wave sensor output signals into sinusoidal commutation signals is used to provide the ability to use 180° commutation at all motor speeds. In this example, a first mode of converting the sensor signals into sinusoidal commutation signals is used at low motor speeds while the technique described above for generating the position feedback signal 52B provides sinusoidal commutation at motor speeds above a selected threshold (about 100 RPM in one example).

Figure 7:
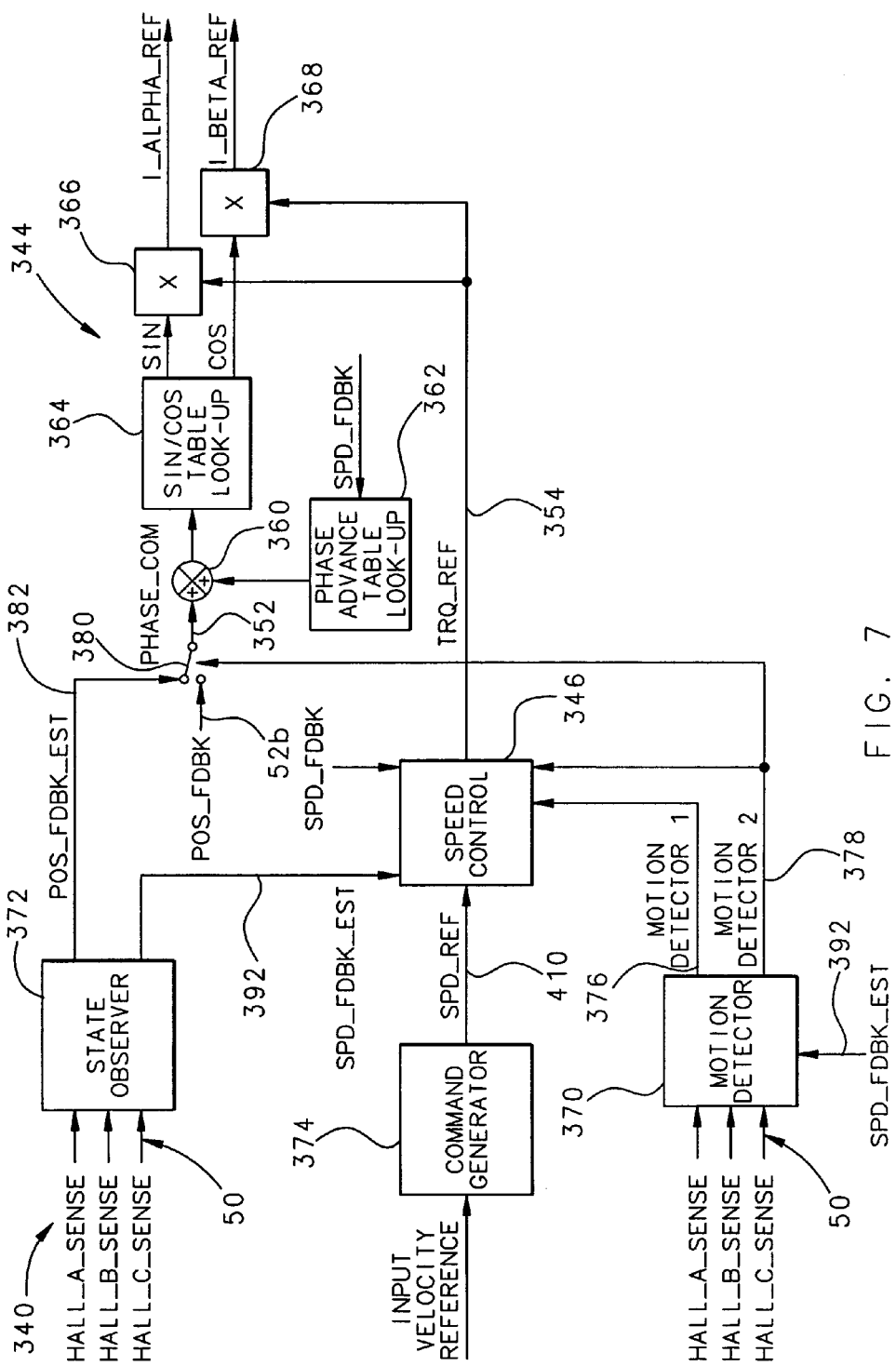
FIG. 7 schematically illustrates selected portions of another system controller designed according to an embodiment of this invention.

Referring to FIG. 7, selected portions of a modified controller 340 is schematically illustrated. Portions of a torque control module 344 are shown including a summer 360, a sin/cos look-up table 364, multipliers 366 and 368 and a phase advance look-up table 362. Each of these components correspond to similarly situated components in the embodiment of FIG. 3 (with a difference in the reference numbers of 300). A modified speed control module 346 is used in place of the speed control module 46 from the embodiment of FIGS. 2 and 6. Additionally, a motion detector 370, state observer 372 and command generator 374 are used in the embodiment of FIG. 7.

The motion detector 370 receives input from the low resolution position sensor 38, which comprises three square wave output signals 50 in this example. The example motion detector 370 comprises a counter that increments upon detecting at least one edge of each sensor output signal. In one example, the leading edge of each sensor output signal is used as the trigger for incrementing the counter of the motion detector.

The motion detector 370 provides two different output signals 376 and 378. The output signal 376 is a first motion detector signal that indicates some motion of the motor has been detected. The output signal 378 begins after a selected number of counts has been reached to indicate that reliable motion detection has begun. In one example, the output signal 376 corresponds to the first few sensor output pulse edges registered by the motion detector 370. The output signals 376 and 378 are provided to the speed control module 346.

The output signal 378 is also used to control a switch 380 that switches between the low speed sinusoidal commutation mode and the higher speed sinusoidal commutation mode. The switch 380 controls the input 352 to the summer 360 based upon the speed of the motor as provided by the output signal 378. In this example, the switch 380 switches between an output 382 from the state observer which provides a position feedback estimate and the position feedback signal 52B of the position sensor processing module from FIG. 4, for example. The output 382 from the state observer 372 is used at low speeds and provides the ability to use sinusoidal commutation even at very low speeds.

Figure 8:
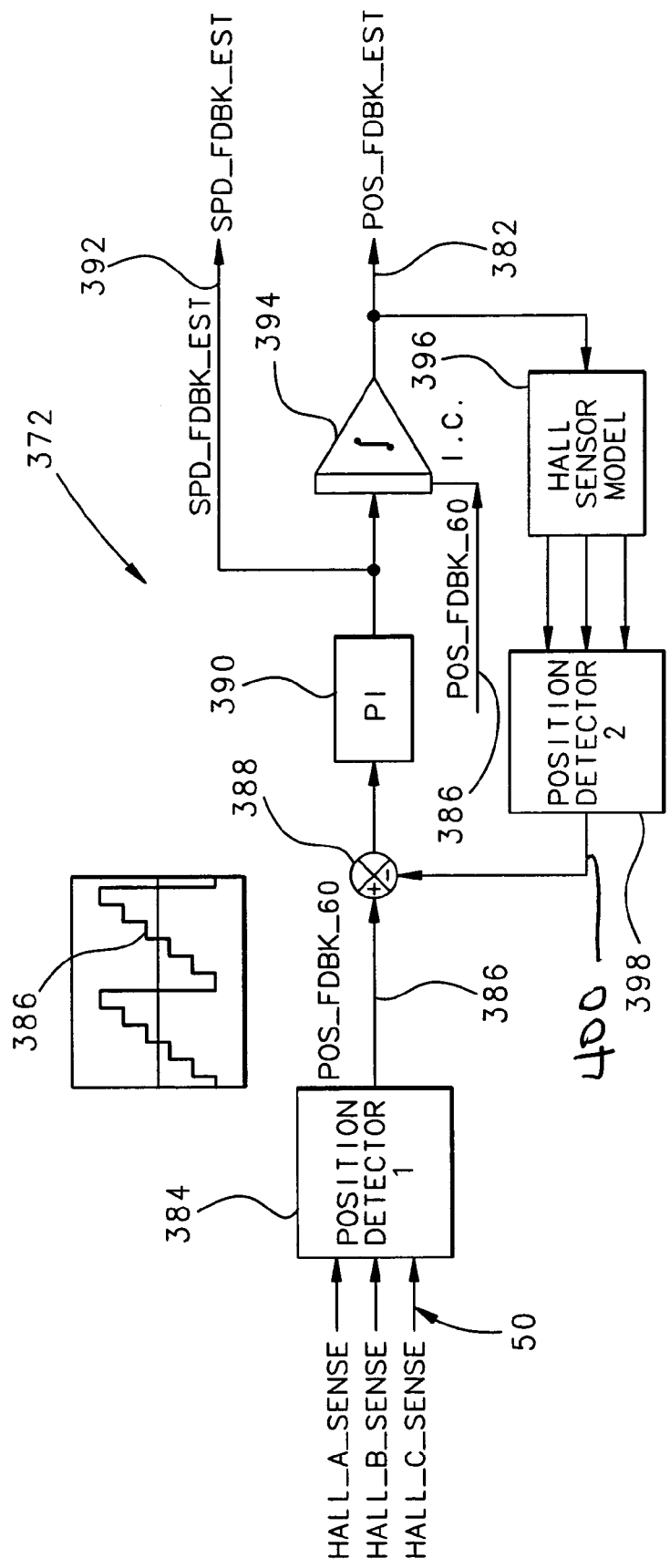
FIG. 8 schematically illustrates a state observer module of the embodiment of FIG. 7.

FIG. 8 schematically illustrates an example state observer 372. In this example, a position detector 384 that operates as a counter and increments 60° at each leading edge or falling edge of the position sensor signals. An output signal 386 from the position detector 384 in this example is a staircase function 386 that repeatedly increments between 0° and 360° responsive to the edge detection of the position detector 384. The output signal 386 is provided to a summer 388 and then a regulator 390. In one example, the regulator 390 is a proportional-integral regulator. In another example, a bang-bang control regulator is used. An output 392 of the regulator 390 provides a speed feedback estimate that is proportional to motor speed. This is provided to the speed control module 346 and the motion detector 370 as can be appreciated from FIG. 7.

An integrator 394, which is initialized during power-up by the staircase signal 386, converts the staircase signal 386 into a "smooth" sawtooth signal 382 that provides the position feedback estimate (i.e., motor electrical angle information) for sinusoidal commutation at low motor speeds. In this example, the integrator 394 is a modular 2π integrator so that a smooth ramped or sawtooth wave form results at 382.

In the example of FIG. 8, a feedback loop includes a position sensor model 396 that provides three outputs to another position detector 398 that generates another staircase function 400 that is provided to the summer 388. In this example, the staircase function 400 is subtracted from the staircase function 386 to provide an error signal as needed. In this example, the position sensor model 396 generates three pulse train signals shifted by 120 electrical degrees responsive to the sawtooth wave form from the integrator 394.

In one example only the staircase signal 386 from the first position detector 384 is used for motor commutation when additional phase shift in the estimated motor position is undesirable.

The state observer 372 derives rotor position information in a manner that can be used for sinusoidal commutation. In this example, the "smooth" sawtooth wave form signal 382 is used by the torque control module 44 in a similar manner that the sawtooth wave form signal 54B is used for sinusoidal commutation at higher speeds. The staircase signal of the state observer 372 provides the ability to derive rotor position information from a low resolution position sensor for generating sinusoidal commutation signals even at very low motor speeds.

Figure 9:
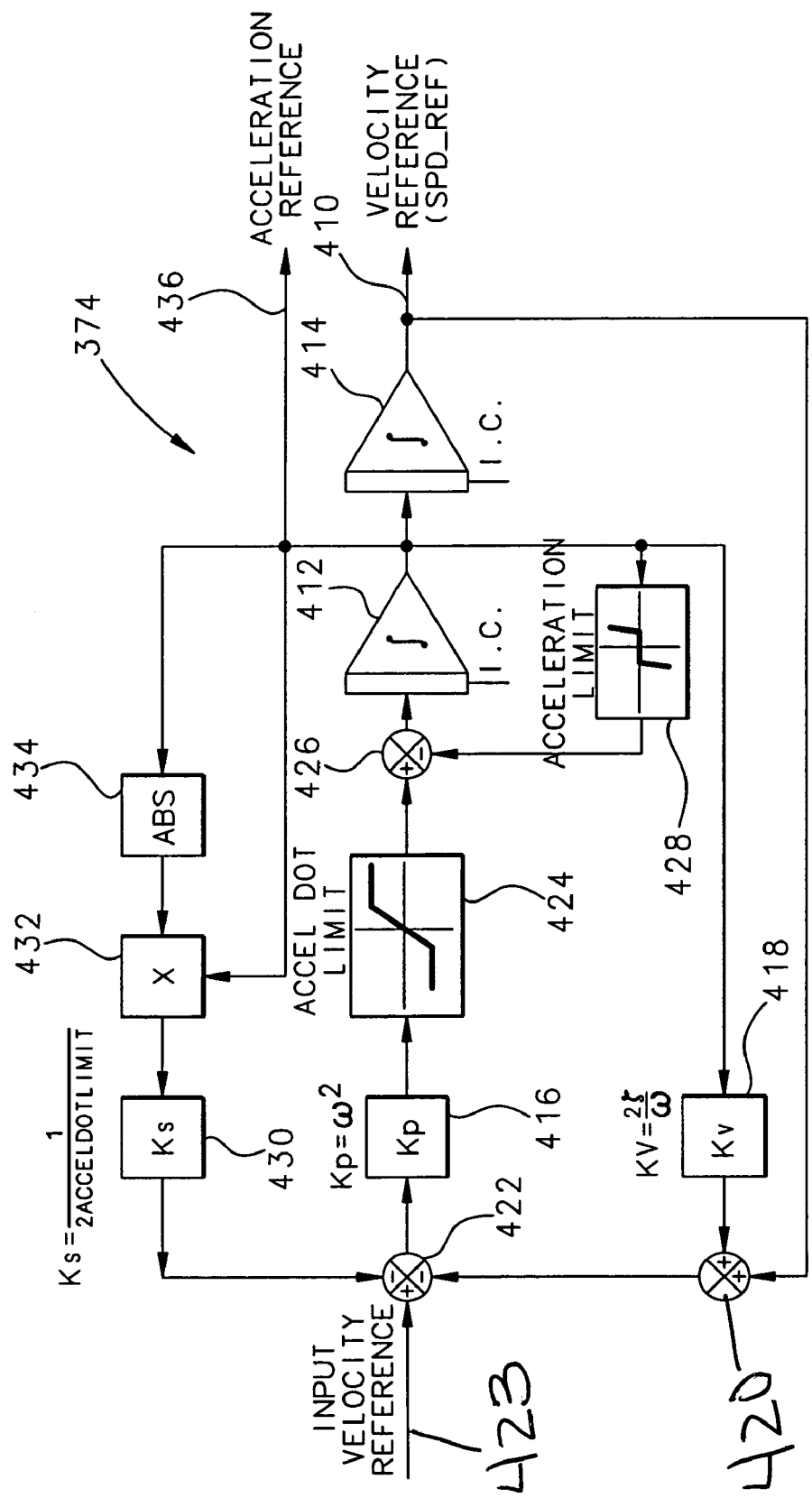
FIG. 9 schematically illustrates a command generator module of the embodiment of FIG. 7.

FIG. 9 schematically illustrates an example embodiment of the command generator 374 that provides a speed reference signal 410 to the speed control module 346. The command generator 374 in this example contains a second order dynamic block having two integrators 412 and 414. The purpose of the command generator is to let the acceleration of the motor 22 ramp up gradually to avoid disturbances in the motor operation. The command generator 374 calculates the speed reference signal 410 based on an acceleration limit and acceleration rate limit information.

The dynamic behavior of the command generator for small signal disturbances is specified by gains Kp 416 and Kv 418. The Kp gain 416 is selected based on a desirable frequency bandwidth of the command generator 374. The Kv gain 418 is selected based on a desirable frequency bandwidth and damping ratio. The damping is intended to avoid undesirable motor behavior responsive to a step change in velocity. The output of the Kv gain 418 is provided to a summer 420 that is then provided to a summer 422 which also receives an input velocity reference signal 423. The output of the summer 422 is provided to the $K_p$ gain 416. The output of the Kp gain 416 is provided to a saturation function 424 with an output provided to a summer 426. The integrator 412 receives the output from the summer 426. A feedback loop of the integrator 412 includes a non-linear dead zone block 428 that provides an acceleration limit.

The output of the first integrator 412 is a signal 436 that provides an acceleration reference. That signal is provided along a non-linear feedback path to a gain block Ks 430. The non-linear feedback gain block 430 specifies the dynamic behavior of the command generator 374 responsive to larger signal disturbances. The input to the gain block 430 is from a multiplier 432 that has the signal 436 as one input and an output from an absolute value block 434 as another input. The gain block 430 provides a time optimal phase trajectory for a second order system with a limit function such as the saturation function block 424. The gain Ks is calculated based on a desirable limit of the acceleration rate.

Figure 10:
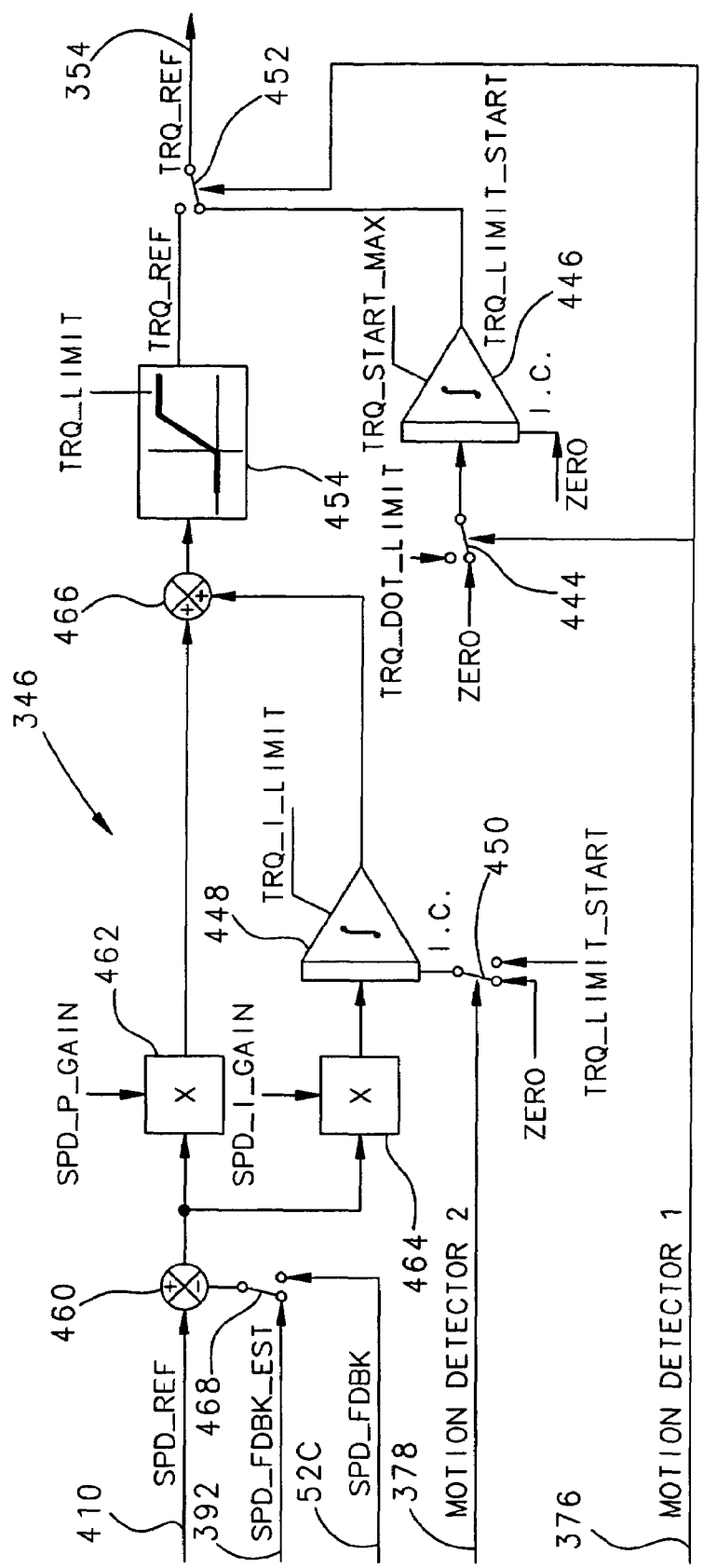
FIG. 10 schematically illustrates a speed controller module of the embodiment of FIG. 7.

The output signal 410 provides a speed reference that governs the speed of operation of the motor. The output signal 410 is provided to the speed control module 346 as can be appreciated from FIG. 10.

The speed controller module 346 in this example utilizes the speed feedback estimate signal 392 from the state observer 372 at low motor speeds. When the motion detector output signal 378 indicates a sufficiently high motor speed (i.e., 100 RPM), a switch 468 changes one of the inputs to a summer 460 from the speed feedback estimate signal 392 to the speed feedback signal 52C available from the embodiment of FIG. 4, for example.

At the beginning of motor movement, the motion detector output signal 376 switches a switch 444 so that an integrator 446 receives a torque dot limit input signal to begin ramping up the torque reference signal 354. After some amount of motion detection (100 counts within the motion detector in one example), the motion detector output signal 378 initializes an integrator 448 by operating the switch 450. At the same time, a switch 452 changes over from receiving output from the integrator 446 to receiving the torque reference signal 354 from the output of a saturation function block 454.

At low motor speeds, the speed feedback estimate signal 392 and the speed reference signal 410 from the command generator 374 are combined in a summer 460. The output of the summer 460 is multiplied in multipliers 462 and 464. The other input to the multiplier 462 is a proportional speed gain signal that is preset in one example. The multiplier 464 also receives an integral gain input signal. Another summer 466 combines the multiplied and integrated signals and the output from the saturation function block 454 provides the torque reference signal 354.

After the motor speed increases beyond a selected threshold, the motion detector signal 378 operates another switch 468 so that the input to the summer 460 switches from the speed feedback estimate signal 392 from the state observer 372 to the speed feedback signal 52C from the position sensor processing module 42 of FIGS. 2 and 4, for example.

One difference between the speed controller module 346 of this figure and that shown in FIG. 6 is that closed loop control is used for switching between the initial torque ramp up, the use of the speed feedback estimate signals 392 at low motor speeds and the speed feedback signal 52C at higher motor speeds. In the example of FIG. 6, open loop switching control is used.

As can be appreciated from FIGS. 7-10, this embodiment utilizes 180° commutation throughout the entire motor control beginning at very low speeds, even though low resolution position sensors providing square wave outputs are utilized to provide rotor position information. This embodiment improves soft starting capabilities and reduces the switching modes to simplify control and tuning compared to the embodiment of FIGS. 4 and 6, for example, where the controller uses 120° (i.e., square wave) commutation at low motor speeds and then switches to sinusoidal (180° commutation) after a selected threshold is reached.

Figure 11:
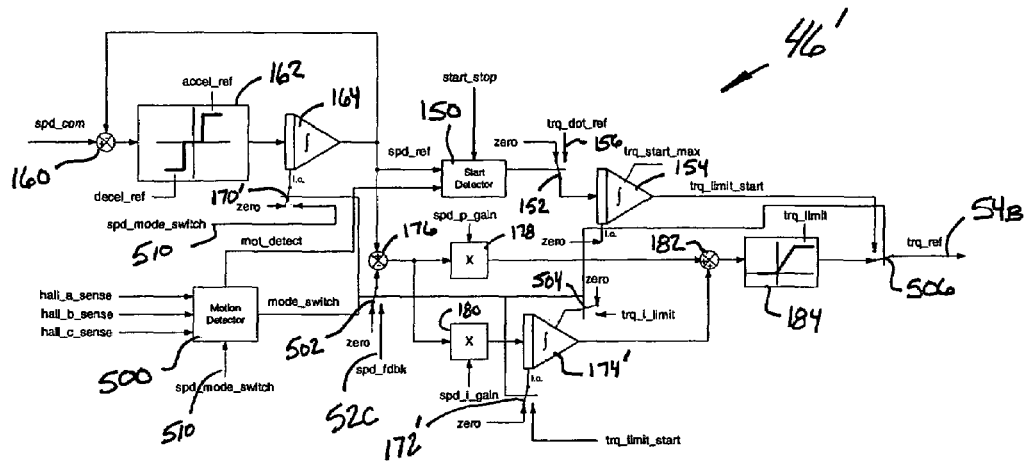
FIG. 11 schematically illustrates another example speed control module.

Referring to FIG. 11, a modified speed control module 46' includes a unique arrangement for providing a starting torque signal to the torque control module 44 during initial start up procedures, for example. One advantage of this example embodiment is that it provides a starting torque signal for driving the motor 22 during an initial start up of the turbine engine 24. The starting torque signal ramps up from a zero value at initial start to a selected value and remains constant at that selected value until the motor 22 reaches a chosen threshold speed.

In the example of FIG. 11, the speed control module 46' includes a motion detector 500 that provides an output indicating motor motion. In one example, the motion detector 500 is a counter that provides a number of pulses indicating the motor motion. The output from the motion detector 500 is provided to the start detector 150 and is used to control switches 502, 504, 506, 152, 170' and 172'. When the initial start-stop signal is provided to the start detector 150, the switch 152 is switched so that the torque_dot_reference signal 156 is provided to the integrator 154. At the same time, the switch 506 is connected to the output of the integrator 154. Accordingly, the torque reference signal from the speed control module 46' corresponds to the ramping up output from the integrator 154. The value of the torque_dot- _reference signal 156 controls the rate of torque signal ramp up. At this stage, the torque reference signal from the speed control module 46' can be considered an initial starting torque reference signal.

The start detector 150 also receives an output signal from the motor detector 500. Once the motion detector output signal indicates that the motor 22 has reached a chosen threshold speed, the start detector 150 switches the switch 152 to a zero value. At this point the output of the integrator 154 remains constant and the initial starting torque reference signal remains constant. In this example, that constant-value torque reference signal is provided to the torque control module 44 until the motor speed increases to a second selected threshold.

In this example, the motion detector 500 eventually detects motor motion that corresponds to a selected value of a speed_mode_switch signal 510. At that time, in one example the controller 40 switches between commutation modes. In FIG. 11, once this second threshold is met, the speed control module 46' is switched into a mode so that the torque reference signal 54B is responsive to the speed command signal provided to the summer 160. At this point, the mode switch output signal from the motion detector 500 controls the switch 502 to switch the input to the summer 176 from a zero value to the speed feedback signal 52C. At the same time, the switch 506 is switched from the output of the integrator 154 to the output of the torque limiting block 184. At the same time, the integrator 174' is controlled by operation of the switches 172' and 504. The mode switch output from the motion detector 500 also controls the switch 170' to initialize the integrator 164.

In one example, once the second selected motor threshold speed is reached, the speed control module 46' provides the torque reference signal 54B in a manner similar to that described above with reference to FIG. 6.

The example of FIG. 11 allows for ramping up an initial, starting torque reference signal from zero to a level that enables motion of the motor. Holding the torque reference signal at a constant value once the motor speed reaches the first selected threshold allows for using a low resolution speed sensor signal, for example, at low motor speeds. When the motor speed is very low, it is difficult to use closed loop speed control because reliable information is not available from typical low resolution position sensors until the motor is moving at a sufficient speed. This example technique for providing an initial, starting torque reference signal provides for a controlled and predictable torque control during initial start up. In examples where the controller switches between square wave commutation and sinusoidal commutation, the switching between the initial, starting torque reference signal and the operating torque reference signal can be timed to be simultaneous with the switch between square wave commutation and sinusoidal commutation.

Figure 12:
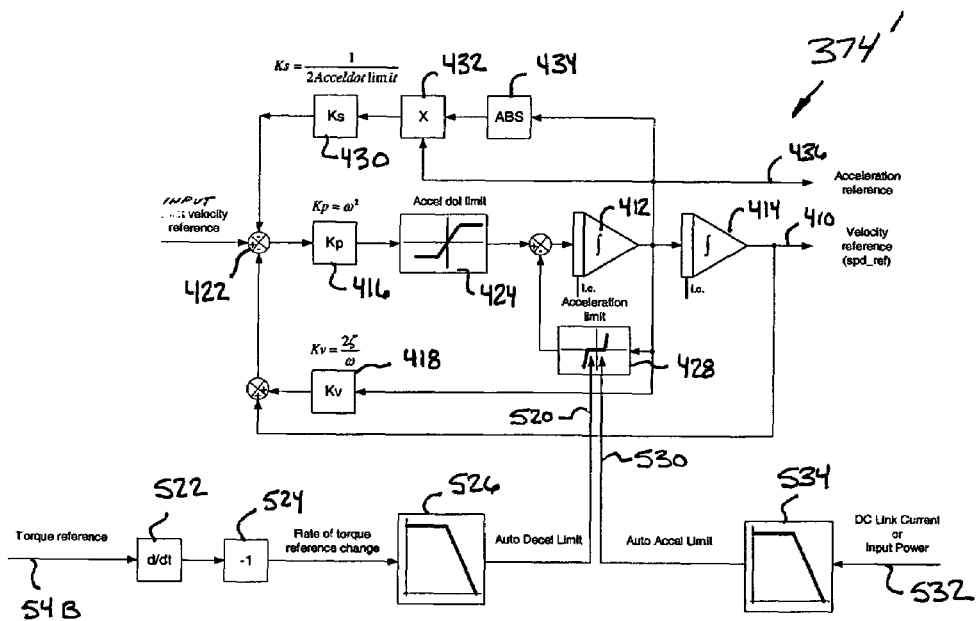
FIG. 12 schematically illustrates another example command generator module.

Referring to FIG. 12, a modified command generator 374' is shown, which operates similar to the command generator of the embodiment of FIG. 9. In this example, however, an additional acceleration rate control feature is provided. With the example schematically shown in FIG. 12, the acceleration rate need not be set at a fixed or constant rate. With this example, it becomes possible to dynamically and automatically limit the acceleration rate based on a DC link current or input power determination. Additionally, the example of FIG. 12 allows for dynamically and automatically limiting the deceleration rate based on a negative rate of torque reference signal change, which avoids undesirable disengagement between the motor 22 and the engine 24. Example systems that include a clutch for coupling the motor 22 to the engine 24 will benefit from using such information about the torque reference signal to control the acceleration limit to avoid disengagement.

In the example of FIG. 12, the non-linear dead zone block 428 controls the acceleration limit responsive to dynamic input regarding operation of the system. This differs from the embodiment of FIG. 9, for example, where the acceleration limit was set at a fixed value. In the example of FIG. 12, two different inputs to the non-linear dead zone block 428 provide for dynamic and automatic adjustment of the acceleration limit.

One of the input signals 520 is based upon the torque reference signal 54B. A derivative block 522 takes a derivative of the torque reference signal 54B to detect a change in the signal over time. The output of the inverter 524 is provided to a deceleration limit functional block 526. Inverting the derivative allows for controlling situations where the torque reference signal is decreasing at an undesirable rate by monitoring the negative change in the torque reference signal. The output of the block 526 provides the input signal 520 to the non-linear dead zone block 428.

In one example, if the derivative of the torque reference signal 54B does not exceed the area under the curve set within the functional block 526, the change in the torque reference signal is considered acceptable and there is no adjustment to the deceleration limit. If, on the other hand, the change in the torque reference signal 54B is outside of the limit set by the functional block 26, the input signal 520 provides an indication of how much to change the deceleration limit to avoid disengagement, for example.

Another input 530 is provided to the block 428 in the example of FIG. 12. The signal 530 is based upon an input signal 532. In one example, the input signal 532 comprises a DC link current value. In another example, the input signal 532 is based upon input power to the motor 22. A functional limiting block 534 includes a curve selected to control the acceleration rate. When the DC link current or the input power, for example, is outside of the area under the curve in the functional block 534, that is an indication that the motor is accelerating too fast. When the DC link current, for example is too high, that is an indication that the acceleration is higher than desirable. In such a circumstance, the input signal 530 causes an adjustment to the acceleration rate set within the block 428.

The example of FIG. 12, therefore, provides at least two different ways for dynamically and automatically adjusting the acceleration rate within the controller 40 to provide improved motor control responsive to system operating parameters.

Figure 13:
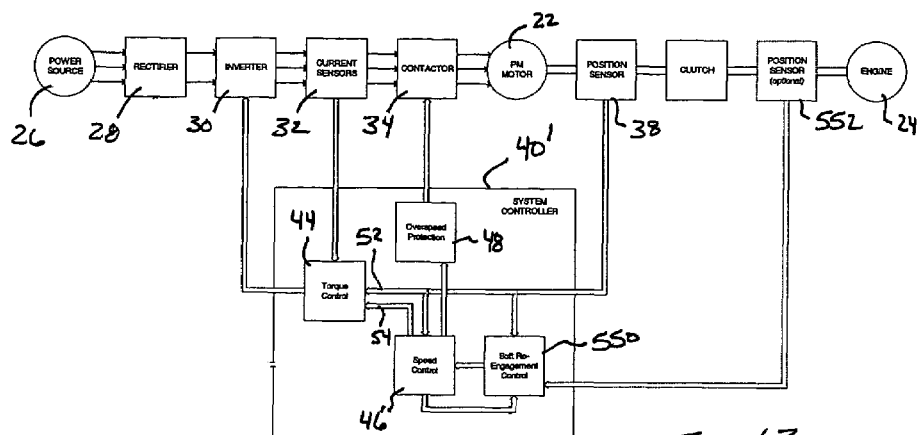
FIG. 13 schematically illustrates an electric start system that is modified compared to the embodiment of FIG. 1.

FIG. 13 schematically shows a modified system compared to that shown in FIG. 1. In this example, selected portions of the controller 40' are shown including a soft reengagement control module 550. Outputs from the position sensor 38 and an engine position sensor 552 are processed by the soft reengagement control module to control motor torque during reengagement after the motor 22 has been disengaged from the engine 24, for example.

Figure 14:
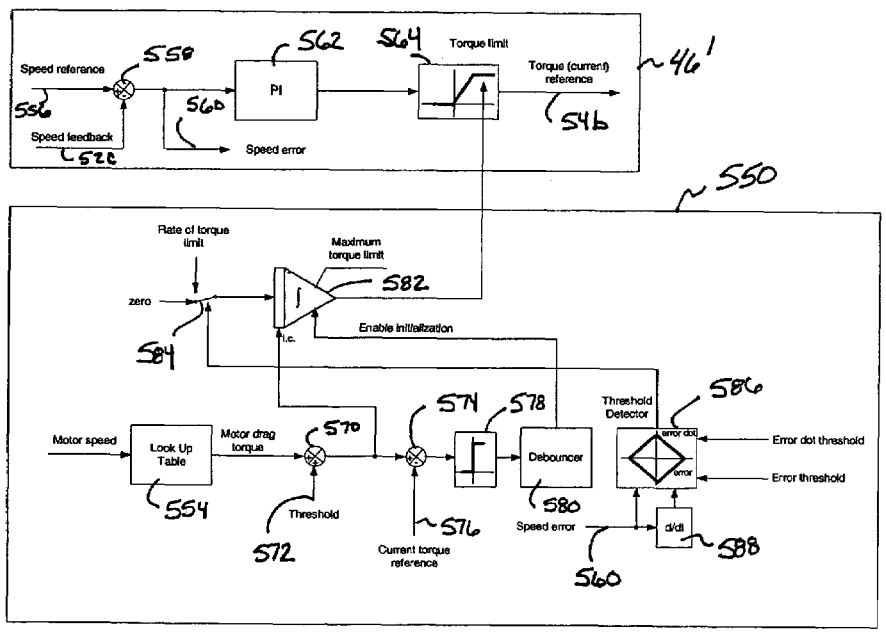
FIG. 14 schematically illustrates a soft reengagement control module useful in the embodiment of FIG. 13.

FIG. 14 schematically shows the speed control module 46' and the soft reengagement control module 550 of the controller 40'. In this example, the controller detects motor disengagement for a predetermined time period. The torque limit of the speed controller is set to a preselected level, which is above the torque required to sustain the presently controlled motor speed. Ramping up the torque control signal beyond that required for present motor speed provides for improving reengagement and reducing the possibility of exciting the dynamic system. In one example, the torque signal is ramped up during reengagement to a maximum possible value corresponding to 100% of the torque producing capability of the motor 22.

In one example, the soft reengagement control module 550 determines a speed difference between the motor 22 and the engine 24 to detect disengagement. In one example, the outputs of the sensors 38 and 552 are compared for determining speed differences between the motor 22 and engine 24.

In the example of FIG. 14, a difference between an estimated motor drag torque and the commanded torque reference signal is used to determine whether disengagement has occurred. In this example, motor speed information is provided to a look up table 554, which relates motor speed to motor drag torque according to known functional relationships between those quantities. The output of the look up table 554 provides an estimate of the motor drag torque.

In the example of FIG. 14, reengagement is determined by monitoring a change in a speed error and the rate of the speed error change.

The speed control module 46' of FIG. 14 determines a speed error between a speed reference command signal 556 and the speed feedback signal 52C. A summer 558 subtracts the speed feedback signal 52C from the speed reference signal 556 resulting in the speed error signal 560. A regulator 562, which is a proportional integral regulator in this example, receives the speed error signal 560 and provides an output to a torque limiting function block 564.

The soft reengagement control module 550 can dynamically control the torque limit of the functional block 564. Under appropriate circumstances, the soft reengagement control module 550 changes the torque limit of the functional block 564 to increase the torque reference signal 54B, for example, from a present signal value corresponding to an operating motor speed to a much higher value to be used for reengagement control. By using a ramped-up torque value during reengagement, the arrangement of FIG. 14 minimizes torque ripple during reengagement.

In the example of FIG. 14, the motor drag torque output from the look up table 554 is provided to a summer 570 that combines the motor drag torque value with a selected threshold value 572. In one example, the threshold value 572 is chosen to increase the torque value beyond the motor drag torque because the motor is always accelerating. The output of the summer 570 is provided to a summer 574 that subtracts a current torque reference value 576 from the output of the summer 570. During normal operation of the motor, the current torque reference value 576 will be approximately equal to the motor drag torque.

The output of the summer 574 is processed by a zero crossing detector 578 and a debouncer 580. This example arrangement insures reliably detecting disengagement. For example, when the motor is disengaged from the engine, the motor speed drops. The current torque reference value also drops. Accordingly, there will be a change in the output of the summer 574 that results in an appropriate response from the zero crossing detector 578 and debouncer 580. The output of the debouncer 580 is used to initialize an integrator 582.

The output of the integrator 582 is used to automatically adjust the torque limit in the saturation function block 564 responsive to detecting disengagement. In one example, the integrator 582 ramps up the torque limit toward a maximum torque limit, which corresponds to 100% of the torque capabilities of the motor 22.

In the illustrated example, a switch 584 controls whether the integrator 582 continues to ramp up the torque limit or to hold it at a steady value by controlling the input to the integrator 582. When the input is zero as shown by the position of the switch 584 in FIG. 14, the output of the integrator will remain constant. When the switch 584 changes to the rate of torque limit input, the output of the integrator 582 ramps up and the torque limit correspondingly increases.

In the illustrated example, the switch 584 is controlled responsive to a non-linear function block 586 that receives the speed error signal 560 as one input and a change over time in that signal from a derivative function block 588 as a second input. The operative zone of the non-linear block 586 preferably is set so that during reengagement if the inputs are outside of the zone, the integrator 582 gets switched to automatically ramp up the torque signal value. By ramping up the torque signal value in a linear fashion, this minimizes shock at reengagement. Additionally, the speed loop is tuned for stability because the speed control module 46' is arranged as schematically shown and responds to an appropriate input from the soft reengagement control module 550.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An electric start system, comprising
   an electric motor operably associated with a device, the electric motor providing movement for starting the device; and
   a controller that controls movement of the electric motor and performs at least one of:
   (A) providing a starting torque signal for driving the motor during an initial start up of the device, the starting torque signal ramping up from a zero value to a selected value and remaining constant at the selected value until the controller determines that the motor has reached a chosen threshold speed;
   (B) determining when an acceleration rate of the motor is outside of a selected range and automatically altering the acceleration rate to continue operating the motor using an altered acceleration rate resulting from the altering; and
   (C) determining when the motor is disengaged from the device and changing a motor torque reference signal from a present signal value corresponding to a present motor speed to a higher value.

2. The system of claim 1, wherein the device comprises a gas turbine engine.

3. The system of claim 1, wherein the controller performs the providing step (A) and switches between square wave commutation and sinusoidal commutation, the controller performing the providing step (A) during the square wave commutation.

4. The system of claim 3, including a low-resolution position sensor that provides a square wave signal indicative of motor motion and wherein the controller uses the square wave signal for the square wave commutation and as a basis for the sinusoidal commutation.

5. The system of claim 3, wherein the controller provides a torque reference signal responsive to a commanded motor speed during the sinusoidal commutation.

6. The system of claim 1, wherein the controller performs the providing step (A) and includes a starting torque integrator that provides the starting torque signal, the integrator receiving a first input for ramping up the starting torque signal and then receiving a second input when the motor has reached the chosen threshold speed such that an output of the integrator and the starting torque signal subsequently remain constant.

7. The system of claim 1, wherein the controller performs the determining step (B) and determines when the acceleration rate is outside of the selected range by determining a rate of change of a torque reference signal that is responsive to a commanded motor speed.

8. The system of claim 1, wherein the controller performs the determining step (B) and determines when the acceleration rate is outside of the selected range by determining a level of input power to the motor.

9. The system of claim 1, wherein the controller performs the determining step (C) and ramps up the torque reference signal value from the present value to the higher value.

10. The system of claim 1, wherein the controller performs the determining step (C) and increases the torque reference signal value toward a maximum value during reengagement of the motor with the device.

11. A method of controlling an electric motor in a electric start system where the motor is used to start a device, comprising operably associating the motor with the device for starting the device and comprising at least one of:
(A) providing a starting torque signal for driving the motor during an initial start up of the device, the starting torque signal ramping up from a zero value to a selected value and using the selected value when the motor reaches a selected threshold speed;
(B) determining when an acceleration rate of the motor is outside of a selected range and automatically altering the acceleration rate to continue operating the motor using the altered acceleration rate; and
(C) determining when the motor is disengaged from the device and changing a motor torque reference signal from a present signal value corresponding to a present motor speed to a higher value.

12. The method of claim 11, including performing the providing step (A) and determining when the motor has reached the selected threshold speed and maintaining the starting torque signal at the selected value.

13. The method of claim 11, including using square wave commutation during the start up and using sinusoidal commutation at higher motor speeds and including performing the providing step (A) during the square wave commutation.

14. The method of claim 13, including providing a low resolution position sensor that provides a square wave signal indicative of motor motion and using the sensor square wave signal for the square wave commutation and for the sinusoidal commutation.

15. The method of claim 13, including providing a torque reference signal responsive to a commanded motor speed during the sinusoidal commutation.

16. The method of claim 11, including performing the determining step (B) and determining when the acceleration rate is outside of the selected range by determining a rate of change of a torque reference signal that is responsive to a commanded motor speed.

17. The method of claim 11, including performing the determining step (B) and determining when the acceleration rare is outside of the selected range by determining a level of input power to the motor.

18. The method of claim 11, including performing the determining step (C) and ramping up the torque reference signal value from the present value to the higher value.

19. The method of claim 11, including performing the determining step (C) and increasing the torque reference signal value toward a maximum value for reengaging the motor with the device.

20. An electric start system, comprising:
an electric motor adapted to be coupled to a device for starting the device; and
a controller that controls movement of the electric motor by providing a starting torque signal for driving the motor during an initial start up of the device, the starting torque signal ramping up from a zero value to a selected value and remaining constant at the selected value until the controller determines that the motor has reached a chosen threshold speed.

21. The system of claim 20, wherein the controller switches between square wave commutation and sinusoidal commutation, the controller providing the starting torque signal during the square wave commutation.

22. The system of claim 21, including a low-resolution position sensor that provides a square wave signal indicative of motor motion and wherein the controller uses the square wave signal for the square wave commutation and as a basis for the sinusoidal commutation.

23. The system of claim 21, wherein the controller provides a torque reference signal responsive to a commanded motor speed during the sinusoidal commutation.

24. The system of claim 20, including a starting torque integrator that provides the starting torque signal, the integrator receiving a first input for ramping up the starting torque signal and then receiving a second input when the motor has reached the chosen threshold speed such that the output of the integrator and the starting torque signal subsequently remain constant.

25. An electric start system, comprising:
an electric motor operably associated with a device for providing movement for starting the device; and
a controller that controls movement of the electric motor and determines when the motor is disengaged from the device and changes a motor torque reference signal from a present signal value corresponding to a present motor speed to a higher value.

26. The system of claim 25, wherein the controller ramps up the torque reference signal value from the present value to the higher value.

27. The system of claim 25, wherein the controller increases the torque reference signal value toward a maximum possible value for the motor during a reengagement of the motor with the device.

28. An electric start system, comprising:
an electric motor adapted to be coupled to a device for starting the device; and
a controller that controls movement of the electric motor and determines when an acceleration rate of the motor is outside of a selected range by determining at least one of a rate of change of a torque reference signal or a level of input power to the motor, the controller automatically alters the acceleration rate if the acceleration rate is outside of the selected range.

29. The system of claim 28, wherein the controller controls movement of the electric motor to continue operating the motor using the altered acceleration rate.

* * * * *